June 2, 1931.  R. F. SICKLES ET AL  1,807,605
RADIO COIL
Filed Sept. 19, 1929
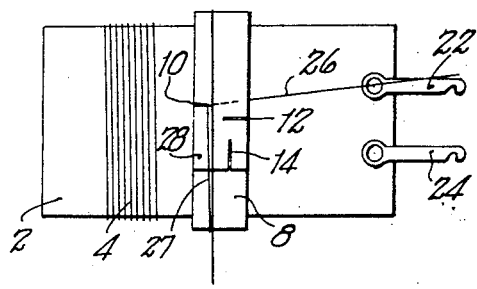
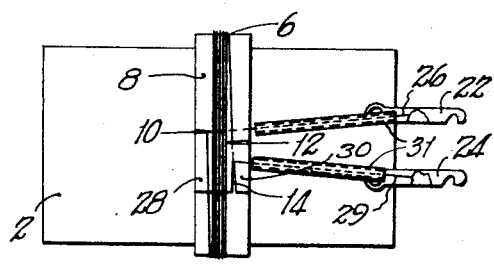
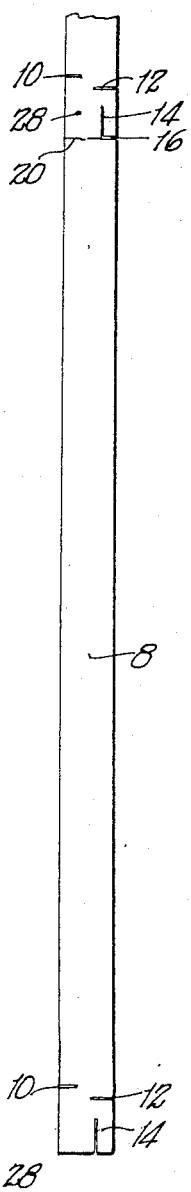
INVENTOR.
Roy F. Sickles and
Frank W. Sickles
BY Walter C. Row
their ATTORNEY.

Patented June 2, 1931

1,807,605

UNITED STATES PATENT OFFICE

ROY F. SICKLES AND FRANK W. SICKLES, OF SPRINGFIELD, MASSACHUSETTS

RADIO COIL

Application filed September 19, 1929. Serial No. 393,787.

This invention relates to improvements in the art of manufacturing coils or inductances and is directed particularly to improvements in means to facilitate the forming of a coil winding and locating the same in a predetermined manner with reference to a support or another coil winding.

It is necessary and desirable in coil manufacture or the making of transformers that one coil consisting of a certain number of turns of wire be located in a certain way with reference to another coil or with reference to a support. Accordingly one object of this invention is the provision of means adapted to facilitate the winding of a coil and locating the same in a predetermined manner.

Another object is the provision of means whereby the coil may not only be formed accurately but which may be located as it is wound at a predetermined location, all to the end that efficiency in manufacture may result and the cost of manufacture be reduced without in the least impairing the efficiency of the product.

The invention is adapted for broad application, but will be described in the form at present preferred in connection with the accompanying drawings in which:

Fig. 1 is a plan view of an element employed in the practise of the invention, and Figs. 2 and 3 are side elevational views of a coil embodying the features of the invention.

Referring to the drawings the invention will now be described in detail.

For purposes of disclosure it will be assumed that it is desired to locate what may be called a "primary coil" having a predetermined number of turns with relation to what may be called a "secondary coil".

In the drawings then, 2 represents a support which may be a tubular core and on which is wound a secondary coil 4. Over this coil 4 and spaced therefrom is to be wound the primary coil 6.

To accomplish the desired result we preferably employ a tape or wrapping 8 which acts as a spacer and to locate the coil 6. This tape will of course be of proper width and suitable in all respects for wrapping about the coil 4 at the proper place. Its thickness may vary and it may be wrapped around the coil 4 a sufficient number of turns to build up the proper thickness and thereby provide the desired spacing between the coils 4 and 6.

The tape is provided with a group of slits such as an entrance slit 10, a locking slit 12, an outlet slit 14 and a parting slit 16, as shown in Fig. 1 of the drawings.

The tape may be prepared or formed in any usual way in order to obtain the desired results. It is convenient however to form the tape by passing a continuous length thereof between devices such as rollers which have on their periphery certain projections or tape cutting elements arranged to provide the slits as the tape passes therethrough.

Preferably the groups of slits will be spaced apart by the devices such a distance as will provide successive tapes of the desired length and there will be one element to perforate the tape as at 20 so that the tapes may be readily separated or pulled apart at this point.

With a tape properly formed, it is wrapped around the coil 4 in such a manner that the end thereof, which is provided with the slits, will be disposed substantially in alignment with terminals 22 and 24 which are fixed to the support, as shown.

Then for the winding of the primary coil 6 and end 26 of a wire from a spool is passed beneath the tape so that it may extend towards the terminal 22, while the run 27 of the wire is extended through slot 10, over the end of the tape 28 and spirally around the tape until the necessary turns are wound. In this way the end portion 28 of the tape is held down by the winding and the end of the coil is at the same time anchored in place.

When the coil winding 6 is completed the wire end 29 is passed downwardly through the locking slit 12, beneath the tape and up through outlet slit 14 and over the corner 30 of the tape as shown in Fig. 3. In this way the end 29 extends transversely of the coil and overlies the portion 30 of the tape.

As will be seen the tape and wire of the winding co-operate to retain the winding or coil in the desired predetermined position. It is possible by providing the correct number of layers of tape to space the primary coil at any desired distance from the secondary coil and by locating the tape in a predetermined manner to thereby locate the coil 6 as may be desired longitudinally of the support and coil 4.

The opposite ends 26 and 29 of the winding 6 may be insulated with tubular insulating material 31 of well known form and secured as by soldering to the terminals 22 and 24. It is desirable that the ends of the coils connected to the terminals be taut and this may be readily accomplished since the wires leading from the winding are suitably held by the novel form of the tape.

The invention may be practised in various ways and in connection with various forms of apparatus without departing from the spirit and scope thereof and therefore we desire to secure the invention as broadly as the law allows.

What we claim is:

1. An inductance comprising in combination, a support, a spacing tape thereon having an end provided with entrance and outlet slits, a coil winding thereon having its ends extending through said slits and beneath parts of said tape whereby the coil is anchored.

2. An inductance comprising in combination, a support having terminals at one end thereof, a spacing tape on said support having an end provided with an entrance slit in a side thereof away from said terminals and an outlet slit in a side adjacent said terminals, a coil winding on said tape having an end extending through said outlet slit and beneath an end portion of said tape to one terminal and its other end extending through said entrance slit and beneath said tape to the other terminal.

3. An inductance comprising in combination, a cylindrical support having terminals at one end thereof, a spacing element on said support formed by winding a tape therearound, an outer end of said tape provided with an entrance slit on a side thereof disposed transversely thereof and an outlet slit disposed longitudinally thereof and a coil winding about said tape having its opposite ends extending through said slits and beneath portions of said tape.

4. An inductance comprising in combination, a cylindrical support having terminals at one end thereof, a spacing element on said support formed by winding a tape therearound, an outer end of said tape provided with an entrance slit on a side thereof disposed transversely and an outlet slit disposed longitudinally thereof, a coil winding about said tape having its opposite ends extending through said slits and beneath portions of said tape and the said ends being secured to said terminals.

5. An inductance comprising in combination, a cylindrical support having terminals at one end thereof, a length of tape wound about said support, an outer end of said tape provided with entrance and locking slits in opposite sides thereof extending transversely thereof and an outlet slit in the end thereof extending longitudinally thereof, a coil winding about said tape having one end extending through said entrance slit and then beneath a portion of said tape and then upwardly through said outlet slit and over a portion of said tape.

6. An inductance comprising in combination, a cylindrical support having terminals at one end thereof, a length of tape wound about said support, an end of said tape provided with entrance and locking slits in opposite sides thereof extending transversely thereof and an outlet slit in the end extending longitudinally thereof, a coil winding about said tape having one end extending through said entrance slit and beneath said tape and the other end extending through said locking slit then beneath a portion of said tape and then upwardly through said outlet slit and over a portion of said tape and the said ends being secured to said terminals and disposed transversely to said coil winding.

7. An inductance comprising in combination, a support, a spacing tape therearound which is provided with entrance and outlet slits, a coil winding about said tape having its opposite ends extending through said slits and beneath parts of said tape whereby the coil is anchored against axial movement.

In testimony whereof we affix our signatures.

ROY F. SICKLES.
FRANK W. SICKLES.